United States Patent [19]

Loomis

[11] Patent Number: 4,627,993

[45] Date of Patent: Dec. 9, 1986

[54] THERMOPLASTIC ELASTOMERIC COMPOSITIONS BASED ON COMPATIBLE BLENDS OF AN ETHYLENE COPOLYMER AND VINYL OR VINYLIDENE HALIDE POLYMER

[75] Inventor: Gary L. Loomis, Drexel Hill, Pa.

[73] Assignee: E. I. Du Pont de Nemours and Company, Wilmington, Del.

[21] Appl. No.: 732,089

[22] Filed: May 9, 1985

Related U.S. Application Data

[63] Continuation-in-part of Ser. No. 572,078, Jan. 19, 1984, abandoned, which is a continuation-in-part of Ser. No. 427,413, Sep. 29, 1982, abandoned, which is a continuation-in-part of Ser. No. 394,329, Jul. 1, 1982, abandoned.

[51] Int. Cl.$^4$ .................... C08L 181/00; C08L 77/00; C08F 265/04; C08K 3/00

[52] U.S. Cl. ...................... 428/36; 428/265; 428/267; 428/290; 428/394; 524/296; 524/297; 524/298; 524/413; 524/422; 524/427; 524/430; 524/444; 524/445; 524/502; 524/513; 524/514; 524/527; 525/185; 525/189; 525/289; 525/301; 525/302; 525/308; 525/312; 525/317

[58] Field of Search .............. 525/289, 301, 302, 308, 525/312, 317, 185, 189; 524/296–298, 413, 422, 427, 430, 444, 445, 502, 513, 514, 527; 428/36, 394, 265, 267, 290

[56] References Cited

U.S. PATENT DOCUMENTS 3,553,348  1/1971  Betts .................................. 174/110
4,340,530  7/1982  Higashiguchi et al. ............. 524/516
4,379,888  4/1983  Yoshimura et al. ................ 525/211

OTHER PUBLICATIONS

Chem. Abs. 95-188466 "Poly(Vinyl Chloride) Compositions", Japan Kokai 81,100,815 (13 Aug. 1981).

Primary Examiner—Herbert J. Lilling

[57] ABSTRACT

A thermoplastic, melt-processible, elastomeric composition based on partially crosslinked compatible blends of an ethylene copolymer and a vinyl or vinylidene halide polymer.

18 Claims, No Drawings

THERMOPLASTIC ELASTOMERIC COMPOSITIONS BASED ON COMPATIBLE BLENDS OF AN ETHYLENE COPOLYMER AND VINYL OR VINYLIDENE HALIDE POLYMER

This is a continuation-in-part of the copending application of Gary Lee Loomis and Robert Joseph Statz Ser. N. 572,078, filed, Jan. 19, 1984, now abandoned, which was a continuation-in-part of their then copending application Ser. No. 427,413 filed Sept. 29, 1982, which was a continuation-in-part of their then copending application Ser. No. 394,329 filed July 1, 1982, both now abandoned.

BACKGROUND

Blends of ethylene copolymers and vinyl halide polymers crosslinked during or subsequent to molding into shaped articles are known in the art as detailed in French Patent No. 2,148,496. The molded articles prepared from these compositions, however, suffer the disadvantage of being thermoset due to the high degree of crosslinking effectuated and, hence, are not reprocessible or remoldable.

Elastomeric thermoplastic compositions based on partially crosslinked incompatible blends of polypropylene and ethylene/vinyl acetate copolymers are also known in the art as detailed in U.S. Pat. No. 4,232,132. This incompatibility results in a multiphase system having a crosslinked elastomeric phase and an uncrosslinked hard phase. However, the elastomeric properties of these compositions (e.g. % permanent tensile set) are poor relative to the elastomeric properties of the compositions of the subject invention.

SUMMARY OF THE INVENTION

The subject invention is a thermoplastic, inherently melt-processible elastomeric composition based on partially crosslinked compatible blends of an ethylene copolymer and a vinyl or vinylidene halide polymer. The melt processibility of these compositions allows shaped articles to be molded therefrom without the time consuming cure step required with conventional rubbers.

More specifically, the subject invention is a partially crosslinked, thermoplastic, melt-processible, elastomeric blend of (a) a copolymer of ethylene and one or more ethylenically unsaturated organic monomers selected from the group consisting of esters of unsaturated $C_3$-$C_{20}$ mono- or dicarboxylic acids, vinyl esters of saturated $C_2$-$C_{18}$ carboxylic acids, vinyl alkyl ethers wherein the alkyl group has 1-18 carbon atoms, vinyl or vinylidene halides, acrylonitrile, methacrylonitrile, norbornene, alpha-olefins of 3-12 carbon atoms, and vinyl aromatic compounds and (b) between 5 and 75 weight percent, based on the composition, of a vinyl or vinylidene halide polymer wherein the comonomer content in (a) is such that the ethylene copolymer is compatible with the vinyl or vinylidene halide polymer; there being present in the blend no polymerizable polyunsaturated compound or polymer of such compound.

DETAILED DESCRIPTION

For the purpose of this invention, the term "polymerizable, polyunsaturated compound" means a non-polymeric compound having two or more polymerizable double bonds, such as, e.g., triallyl cyanurate. Preferred organic monomers which can be copolymerized with ethylene include methyl acrylate, butyl acrylate and vinyl acetate. Of course, more than one organic monomer may be copolymerized with ethylene to form the ethylene copolymer useful in the practice of the subject invention. The melt index range for these copolymers is 0.1 to 1000 (ASTM D-1238), preferably 1 to 100.

The ethylene copolymers useful in the practice of the subject invention need have sufficient comonomer copolymerized therein to exhibit compatability with the vinyl and vinylidene halide polymers described below. Generally speaking, copolymers having a comonomer content of greater than 45 percent based on the weight of the copolymer are useful in the practice of this invention. When an ethylene copolymer is used which is not sufficiently compatible with the vinyl or vinylidene polymers, shaped articles molded from the blends are opaque, show stress whitening when stretched and lack the required recovery to be considered elastomeric. A more detailed discussion of the compatability of these ethylene copolymers with vinyl and vinylidene halide polymers, as well as a discussion of the preparation of the copolymers can be found in *Polymer-Polymer Miscibility*, O. Olabisi, L. M. Robeson and M. T. Shaw, Academic Press, N.Y., N.Y., 1979, U.S. Pat. No. 3,684,778 and U.S. Pat. No. 3,780,140, all herein incorporated by reference.

The ethylene copolymers described above are blended in accordance with the subject invention with 5 to 75, preferably 20 to 60, weight percent based on the blended composition of vinyl or vinylidene halide polymers including copolymers resulting from copolymerization with a comonomer selected from the group consisting of vinyl esters, acrylonitrile, acrylic esters, vinylidene chloride, vinyl chloride, esters of unsaturated carboxylic acids and vinyl ethers. For example, polyvinyl chloride having an inherent viscosity of 0.30 to 1.4 (ASTM D-1243) is generally useful in the practice of the subject invention.

The blending of the ethylene copolymer with the vinyl or vinylidene halide polymer is accomplished by any one of a number of conventional techniques, for example, in a Banbury mixer, two-roll mill or extruder. This blending is done at a temperature high enough to soften the polymers for adequate blending, but not so high as to degrade the vinyl or vinylidene halide polymer. Generally speaking this blending temperature ranges from 140° to 200° C., and blending is carried out for a time sufficient to homogeneously blend the components.

The critical aspect of the subject invention is the partial crosslinking of the ethylene copolymer in the compatible blend. This can be carried out using any one or more of the well known crosslinking techniques including electron beam irradiation, gamma irradiation and free radical curatives such as peroxides. The crosslinking of the ethylene copolymer according to this invention can be carried out before or concurrently with blending with the vinyl or vinylidene halide polymers, or after such blending when using radiation techniques to effectuate the crosslinking.

The term "partially crosslinked" refers to a degree of crosslinking sufficient to transform a blend of an ethylene copolymer as detailed above and a vinyl or vinylidene halide polymer into the thermoplastic elastomeric blends of the subject invention. To quantify the degree of crosslinking, the amount of insoluble, and hence crosslinked, polymer is determined by soaking a sample of the polymer, after crosslinking, in tetrahydrofuran at 23° C. for 16 hours, isolating the insoluble portion and weighing the dried residue, making suitable corrections based upon knowledge of the composition. For example, the weight of components soluble in tetrahydrofuran such as plasticizers are subtracted from the initial weight; and components insoluble in tetrahydrofuran, such as pigments, fillers, etc. are subtracted from both the initial and final weight. The insoluble polymer recovered is reported as percent gel content. This procedure is based on a conventional procedure for quantifying degree of crosslinking that is more fully detailed in U.S. Pat. No. 3,203,937. For purposes of the subject invention, the polymer blends need be partially crosslinked so that they have a gel content of 5 to 90 percent, preferably 10 to 70 percent based on total polymer. The conditions under which this crosslinking is carried out, i.e., type and quantity of crosslinking agent, crosslinking time and temperature, to arrive at a composition having a gel content within this operable range, can be determined empirically. When chemical crosslinking agents are utilized, it is preferable that they be substantially totally consumed during the crosslinking step.

When polyvinyl chloride (PVC) is utilized as the vinyl halide polymer in the practice of the subject invention, spectroscopic evidence indicates that the gel fractions isolated from those partially crosslinked polymer blends contain only crosslinked ethylene copolymer, with no detectable PVC present. It is theorized, therefore, that essentially no crosslinking of the PVC occurs.

Although not essential components of the composition of this invention, various amounts of any number of conventional fillers or compounding ingredients may be admixed. Examples of such ingredients include various carbon blacks, clays, silica, alumina, calcium carbonate, titanium dioxide, antioxidants, antidegradants, tackifiers, processing aids such as lubricants and waxes, and plasticizers such as dialkylphthalates, trialkylmellitates and polyester oligomers. The amounts used depend, at least in part, upon the quantities of other ingredients in the composition and the properties desired from the composition. Also, minor amounts of other saturated and unsaturated polymers such as alpha-olefins may be added to reduce the cost or modify the properties of the composition.

The compositions of the subject invention are melt processable using conventional plastic processing equipment. Articles molded from the unique thermoplastic elastomeric compositions of the subject invention exhibit properties generally only associated with vulcanized rubber. For example, these compositions have resistance to compression set values of about 20 to 70 percent (70° to 100° C.); and elongation at break values of 150 to 600 percent without substantial permanent tensile set (i.e., less than about 15 percent). Various uses for these compositions include wire coverings, seals and gaskets, automotive parts, sheet liners and packaging films. They can be used to coat fabric, industrial belts and various hard surfaces by extrusion coating, for example, polyester, polyamide, polyimide or metal fibre or fabric reinforcement. They find utility in adhesive and sealant applications, as well as for modification of other polymer systems.

Further, compositions within the scope of this invention can be fabricated into tubing for laboratory, medical and industrial uses. Such tubing could also be used as the inner tube of reinforced hoses, wherein the extruded tube is overlaid with wire or textile cords, applied as a spiral, knit or braid. Optionally, a polymeric covering may be applied (extruded or spiral wound calendered sheet) over the reinforced tubing to provide protection from the working environment and mechanical abuse. Compositions within the scope of this invention can be used as the protective covering of reinforced tubes of similar or different composition.

The subject invention will be more fully appreciated with reference to the following examples:

Unless otherwise specified, the percentages given in all examples herein are on a weight percent basis. The intrinsic viscosities (iv) given for the polyvinyl chloride (PVC) are measured in solutions of 0.2 g of the polymer in 100 ml of cyclohexanone at 25° C. The melt indexes (MI) of the ethylene copolymers are measured at 190° C. according to ASTM D-1238.

The following formulations were blended as described below. The PVC, due to its thermal instability, was dry blended with the following stabilizer package as is typical in PVC compounding (percentages based on weight of PVC):

| Component | % |
|---|---|
| Ba/Cd laurates available from Argus Chemical Co. as "Mark" WS | 2.5 |
| Epoxidized soy oil available from Rohm and Haas Co. as "Paraplex" G62 | 8.2 |
| Liquid phosphite chelator available from Argus Chemical Co. as "Mark" 517 | 0.8 |
| Acrylic fusion aid available from Rohm and Haas Co. as "Acryloid" K120N | 2.5 |
| Polyethylene wax available from Allied Chemical Co. as "Allied" 6A | 3.3 |
| Stearic acid | 0.3 |

Batch A was blended in a Banbury internal mixer at 180° C. for 6 minutes and sheeted out on a conventional two-roll mill. Batch B was prepared directly from batch A by adding carbon black on a two-roll rubber mill at 160° to 170° C. after the crosslinking described below.

Electron beam irradiation crosslinking of the ethylene copolymer/ PVC blends in these batches was performed under atmospheric conditions and at ambient temperatures with high energy electrons using a 2 Mev General Electric resonant transformer at 0.3 milliamp (dose rate, 3.0 Mrad/min). Doseage was controlled by the amount of time the blends were subjected to radiation. The blends were irradiated in the form of 15 cm×15 cm×0.3 cm (6"×6"×⅛") plaques. Degree of cross-linking was monitored by observing the change in melt index as the dosage was increased. Irradiation was stopped when the melt index approached or reached a no-flow (no measurable melt index).

|  | Batch: | |
|---|---|---|
|  | A | B |
| E[1]/61% MA[2] (MI = 6) | 70% | 64% |
| PVC ("Geon" 92)[3] iv = 1.02 | 30% | 27% |
| Carbon black N-774[4] | — | 9.0% |

-continued

|  | Batch: | |
| --- | --- | --- |
|  | A | B |
| Irradiation Dosage (Megarads) | 0.9 | 0.9 |

[1] E = ethylene
[2] MA = methyl acrylate
[3] Sold by B. F. Goodrich Co.
[4] ASTM grade designation After blending and crosslinking, to demonstrate that these compositions were melt processible, each batch was placed in a mold at ambient temperature and loaded into a Pasadena hydraulic press, both platens of which had been preheated to 200° C. The pressure was raised to about 1.3 MPa (200 psig) and held for 5 minutes. The pressure was then slowly increased over a 3 minute period to 276 MPa (40,000 psig) and held for an additional 2 minutes. The press was then rapidly cooled to ambient temperature and the molded article removed. Physical measurements taken of each sample are tabulated below, showing that these samples exhibited properties of vulcanized rubber. The molded articles were re-melt processible.

|  | Batch: | |
| --- | --- | --- |
|  | A | B |
| Shore A Hardness[1] | 52 | 75 |
| Compression set B (%)[2] (22 hrs at 70° C.) | 55 | 62 |
| % Volume swell[3] (7 days at 100° C.) | 80 | 78 |
| Clash-Berg Temp. °C.[4] | −25 | −23 |
| Tensile at break (psi)[5] | 863 | 1310 |
| Elongation at break (%)[5] | 440 | 530 |
| $M_{100}$ (psi)[5] | 203 | 380 |
| $M_{200}$ (psi)[5] | 453 | 603 |

[1] ASTM D-2240
[2] ASTM D-395
[3] ASTM D-200 (#3 Oil, 7 days at 100° C.)
[4] ASTM D-1043
[5] ASTM D-412

What is claimed is:

1. A partially crosslinked, thermoplastic, melt-processible, elastomeric blend of
   (a) a copolymer of ethylene and one or more ethylenically unsaturated organic monomers selected from the class consisting of esters of unsaturated $C_3$–$C_{20}$ mono- or dicarboxylic acids, vinyl esters of saturated $C_2$–$C_{18}$ carboxylic acids, vinyl alkyl ethers wherein the alkyl group has 1–18 carbon atoms, vinyl or vinylidene halides, acrylonitrile, methacrylonitrile, norbornene, alpha-olefins of 3–12 carbon atoms, and vinyl aromatic compounds; and
   (b) between 5 and 75 weight percent, based on the composition, of a vinyl or vinylidene halide polymer
   wherein the comonomer content in (a) is such that the ethylene copolymer is compatible with the vinyl or vinylidene halide polymer; there being present in the blend no polymerizable polyunsaturated compound or polymer of such compound.

2. The blend of claim 1 wherein is incorporated one or more of the members of the group consisting of carbon black, clay, silica, alumina, calcium carbonate, titanium dioxide, dialkyl phthalates, trialkyl mellitates, polyester oligomers, and minor amounts of alpha-olefin polymers.

3. The blend of Claim 1 wherein the composition has a gel content of 5 to 90 percent based on total polymer weight.

4. The blend of Claim 1 wherein the composition has a gel content of 10 to 70 percent based on total polymer weight.

5. The blend of Claim 1 wherein the composition has a gel content of 20 to 40 weight percent based on total polymer weight.

6. The blend of Claim 1 wherein (b) is polyvinyl chloride.

7. The blend of Claim 2 wherein (b) is polyvinyl chloride.

8. The blend of Claim 3 wherein (b) is polyvinyl chloride.

9. The blend of Claim 4 wherein (b) is polyvinyl chloride.

10. The blend of Claim 5 wherein (b) is polyvinyl chloride.

11. The blend of Claim 1 wherein the organic monomer is selected from the group consisting of methyl acrylate, butyl acrylate, vinyl acetate and maleic acid monoethyl ester.

12. The blend of Claim 11 wherein the organic monomer is present in the copolymer in an amount greater than about 40 weight percent based on copolymer.

13. A self-supported film comprised of a partially crosslinked, thermoplastic, melt-processible, elastomeric blend of
    (a) a copolymer of ethylene and one or more ethylenically unsaturated organic monomers and selected from the class consisting of esters of $C_3$–$C_{20}$ unsaturated mono- or dicarboxylic acids, vinyl esters of saturated $C_2$–$C_{18}$ carboxylic acids, vinyl alkyl ethers wherein the alkyl group has 1–18 carbon atoms, vinyl or vinylidene halides, acrylonitrile, methacrylonitrile, norbornene, alpha-olefins of 3–12 carbon atoms, and vinyl aromatic compounds and
    (b) between 5 and 75 weight percent, based on the composition, of a vinyl or vinylidene halide polymer
    wherein the comonomer content in (a) is such that the ethylene copolymer is compatible with the vinyl or vinylidene halide polymer; there being present in the blend no polymerizable polyunsaturated compound or polymer of such compound.

14. A self-supported sheet comprised of a partially crosslinked, thermoplastic, melt-processible, elastomeric blend of
    (a) a copolymer of ethylene and one or more ethylenically unsaturated organic monomers selected from the class consisting of esters of $C_3$–$C_{20}$ unsaturated mono- or dicarboxylic acids, vinyl esters of saturated $C_2$–$C_{18}$ carboxylic acids, vinyl alkyl ethers wherein the alkyl group has 1–18 carbon atoms, vinyl or vinylidene halides, acrylonitrile, methacrylonitrile, norbornene, alpha-olefins of 3–12 carbon atoms, and vinyl aromatic compounds; and
    (b) between 5 and 75 weight percent, based on the composition, of a vinyl or vinylidene halide polymer
    wherein the comonomer content in (a) is such that the ethylene copolymer is compatible with the vinyl or vinylidene halide polymer; there being present in the blend no polymerizable polyunsaturated compound or polymer of such compound.

15. A molded article comprised of a partially crosslinked, thermoplastic, melt-processible, elastomeric blend of
  (a) a copolymer of ethylene and one or more ethylenically unsaturated organic monomers selected from the class consisting of esters of $C_3$–$C_{20}$ unsaturated mono- or dicarboxylic acids, vinyl esters of saturated $C_2$–$C_{18}$ carboxylic acids, vinyl alkyl ethers wherein the alkyl group has 1–18 carbon atoms, vinyl or vinylidene halides, acrylonitrile, methacrylonitrile, norbornene, alpha-olefins of 3–12 carbon atoms, and vinyl aromatic compounds; and
  (b) between 5 and 75 weight percent, based on the composition, of a vinyl or vinylidene halide polymer wherein the comonomer content in (a) is such that the ethylene copolymer is compatible with the vinyl or vinylidene halide polymer; there being present in the blend no polymerizable polyunsaturated compound or polymer of such compound.

16. An extruded profile comprised of a partially crosslinked, thermoplastic, melt-processible, elastomeric blend of
  (a) a copolymer of ethylene and one or more ethylenically unsaturated organic monomers selected from the class consisting of esters of $C_3$–$C_{20}$ unsaturated mono- or dicarboxylic acids, vinyl esters of saturated $C_2$–$C_{18}$ carboxylic acids, vinyl alkyl ethers wherein the alkyl group has 1–18 carbon atoms, vinyl or vinylidene halides, acrylonitrile, methacrylonitrile, norbornene, alpha-olefins of 3–12 carbon atoms, and vinyl aromatic compounds; and
  (b) between 5 and 75 weight percent, based on the composition, of a vinyl or vinylidene halide polymer wherein the comonomer content in (a) is such that the ethylene copolymer is compatible with the vinyl or vinylidene halide polymer; there being present in the blend no polymerizable polyunsaturated compound or polymer of such compound.

17. A tubing comprised of a partially crosslinked, thermoplastic, melt-processible, elastomeric blend of
  (a) a copolymer of ethylene and one or more ethylenically unsaturated organic monomers selected from the class consisting of esters of $C_3$–$C_{20}$ unsaturated mono- or dicarboxylic acids, vinyl esters of saturated $C_2$–$C_{18}$ carboxylic acids, vinyl alkyl ethers wherein the alkyl group has 1–18 carbon atoms, vinyl or vinylidene halides, acrylonitrile, methacrylonitrile, norbornene, alpha-olefins of 3–12 carbon atoms, and vinyl aromatic compounds; and
  (b) between 5 and 75 weight percent, based on the composition, of a vinyl or vinylidene halide polymer wherein the comonomer content in (a) is such that the ethylene copolymer is compatible with the vinyl or vinylidene halide polymer; there being present in the blend no polymerizable polyunsaturated compound or polymer of such compound.

18. A polyester, polyamide, polyimide or metal fibre or fabric extrusion coated by a composition comprising a partially crosslinked, thermoplastic, melt-processible, elastomeric blend of
  (a) a copolymer of ethylene and one or more ethylenically unsaturated organic monomers selected from the class consisting of esters of $C_3$–$C_{20}$ unsaturated mono- or dicarboxylic acids, vinyl esters of saturated $C_2$–$C_{18}$ carboxylic acids, vinyl alkyl ethers wherein the alkyl group has 1–18 carbon atoms, vinyl or vinylidene halides, acrylonitrile, methacrylonitrile, norbornene, alpha-olefins of 3–12 carbon atoms, and vinyl aromatic compounds; and
  (b) between 5 and 75 weight percent, based on the composition, of a vinyl or vinylidene halide polymer wherein the comonomer content in (a) is such that the ethylene copolymer is compatible with the vinyl or vinylidene halide polymer; there being present in the blend no polymerizable polyunsaturated compound or polymer of such compound.

* * * * *